United States Patent [19]
Priest

[11] Patent Number: 5,541,587
[45] Date of Patent: Jul. 30, 1996

[54] SYSTEM FOR DETERMINING THE TRUE DEPTH OF AN ELECTRICAL LOGGING TOOL WITHIN A WELLBORE

[75] Inventor: John F. Priest, Tomball, Tex.

[73] Assignee: Western Atlas International, Inc., Houston, Tex.

[21] Appl. No.: 571,009

[22] Filed: Dec. 12, 1995

Related U.S. Application Data

[63] Continuation-in-part of Ser. No. 375,359, Jan. 19, 1995, abandoned.

[51] Int. Cl.$^6$ .............................. G01V 1/40; G01V 1/00
[52] U.S. Cl. ........................................ 340/854.1; 367/33
[58] Field of Search ..................... 367/33; 340/854.1, 340/854.2, 844.9

[56] References Cited

U.S. PATENT DOCUMENTS

| | | | |
|---|---|---|---|
| H1,289 | 2/1994 | Kyle | 367/33 |
| 3,490,149 | 1/1970 | Bowers | 340/854.1 |
| 4,545,242 | 10/1985 | Chan | 340/854.1 |
| 4,803,479 | 2/1989 | Graebner et al. | 340/854.1 |

Primary Examiner—Ian J. Lobo
Attorney, Agent, or Firm—Richard A. Fagin

[57] ABSTRACT

The present invention is a system for determining the depth of a logging tool attached to a cable extended into a wellbore penetrating an earth formation. In a preferred embodiment, the system includes a circuit for generating a measurement of phase shift in a sinusoidal electrical signal traversing the cable, the phase shift corresponding to a length of the cable. The system also comprises an accelerometer disposed within the tool and electrically connected to a bandpass filter and thence to a double integrator connected to the bandpass filter. The integrator calculates displacement of the tool coaxial with the wellbore. The phase shift measurement is filtered in a low pass filter. The low pass filter and the bandpass filter comprise at least some amount of bandpass overlap. The integrator output is used to generate a scale factor, which is applied to the filtered phase shift signal. The scaled phase shift signal is combined in a computer with a signal generated by a depth encoder. The encoder signal corresponds to the amount of cable extended into the wellbore. The computer calculates the depth of the tool in the wellbore by combining the encoder signal with the scaled phase shift signal and the integrated accelerometer signal.

17 Claims, 7 Drawing Sheets

SYSTEM FOR DETERMINING THE TRUE DEPTH OF AN ELECTRICAL LOGGING TOOL WITHIN A WELLBORE

CROSS REFERENCE TO RELATED APPLICATIONS

The present application is a continuation-in-part of application Ser. No. 08/375,359, filed on Jan. 19, 1995 now abandoned and assigned to the assignee of the present invention.

BACKGROUND OF THE INVENTION

1. Field of the Invention

The present invention is related to the field of electric wireline well logging. More specifically, the present invention is related to a means for determining the true depth of a well logging tool within a wellbore when the tool is extended into the wellbore by means of an electrical cable.

2. Description of the Related Art

Electric wireline logging cables are used to convey various types of measuring instruments into wellbores penetrating earth formations. The instruments generate signals which are related to physical properties of the earth formations. A record of the properties of the earth formations is made at a plurality of depths within the wellbore. The record is typically made while pulling the instrument out of the wellbore by reeling the logging cable onto a winch or similar spooling device, while simultaneously recording the signals generated by the instruments. The record of the measurements is thus made to correspond to the depths within the wellbore at which the measurements were made.

Measurement of the depth of the instrument in the wellbore is typically accomplished by using a calibrated wheel placed in frictional contact with the cable. The calibrated wheel turns correspondingly with the amount of linear motion of the cable past the wheel as the cable is moved into or out of the wellbore by the winch. The wheel can be rotationally coupled to a mechanical counter calibrated to indicate the length of cable moved past the wheel, or the wheel can be coupled to an encoder connected to a counter or computer for electronically indicating the length of cable moving past the wheel.

Calibrated wheels can accurately determine the total length of cable which has been moved past the wheel into the wellbore, but the true depth of the instrument in the wellbore may not correspond exactly to the total length of cable moving past the wheel because the cable is subject to stretch as tension on the cable varies.

The tension on the cable is affected by, among other things, the total weight of the cable disposed within the wellbore, which can be as much as 500 pounds for each 1000 feet of cable, the weight of the instrument when it is inserted into the wellbore, which can vary depending on how much of the instrument volume is enclosed air space and on the density of a fluid which may fill the wellbore, and friction caused by movement of the instrument against a wall of the wellbore.

Friction is the least predictable of the causes of tension on the cable as it is moved into and out of the wellbore because the wall surface of the wellbore has an unknown degree of roughness and the earth formations penetrated by the wellbore have unknown frictional coefficients. Fluid which typically fills the wellbore, called drilling mud, can have varying viscosity at different depths within a particular wellbore, making determination of friction even more difficult.

The measurements made by the instrument can have been made at depths as much as twenty feet or more different from the depth indicated by the calibrated wheel because of tension induced stretch in the cable as the instrument is pulled out of the wellbore.

A method for compensating the depth measurement for the amount of stretch in the cable is described for example in U.S. Pat. No. 4,803,479 to Graebner, et al. The method disclosed in the Graebner patent includes making a measurement of a shift in the phase of an electrical signal sent through the entire cable and returned to equipment at the earth's surface, the phase shift measurement related to the phase shift of the same electrical signal sent through a reference cable disposed at the earth's surface having invariant length. In the method of the Graebner patent, phase shift in a constant frequency electrical signal depends only on the change in transmission time of the signal, so phase shift corresponds to a change in the length of the electrical conductors in the cable.

A limitation of the method of the Graebner et al '479 patent is that the change in the length of the electrical conductors in the cable may not correspond exactly to a change in the length of the cable. Electrical logging cable typically comprises a plurality of insulated electrical conductors covered by helically-wound steel armor wires. A logging cable typically comprises seven conductors, six of the conductors being helically wound around the seventh conductor. When such a multiple conductor cable is stretched, some of the stretch is consumed by unwinding the helically wound conductors, so the cable length increases more than the length of the helically-wound conductors increases.

Another limitation of the method disclosed in the Graebner et al '479 patent is that the ratio of change in cable length to the phase shift of the electrical signal, called the scale factor, must be determined for each particular cable because electrical signal transmission properties can vary somewhat among different cables.

A still further limitation of the method disclosed in the Graebner et al '479 patent is the need to use of an additional conductive means at the earth's surface to provide a fixed length phase reference for comparison of phase change in the logging cable. A substantial length of cable to be used as a fixed length reference can occupy a significant storage space, which can be impractical.

It is also quite common to cut small lengths, such as 100 to 300 feet, from the end of a particular cable which is lowered into the wellbore as that end of the cable becomes worn or damaged. In other circumstances, the cable must be cut in order to retrieve an instrument which has become stuck in the wellbore, the cut cable later reassembled by splicing. Each time a cable is cut, the scale factor may have to be again determined by imparting a known amount of stretch to the cable and measuring the phase shift caused by the known stretch. It is difficult to recalibrate the scale factor at the wellbore location since equipment intended to impart a known stretch to the cable typically can be located only at a specialized facility.

A still further limitation of the system disclosed in the Graebner et al '479 patent is that the accuracy of the measurement of phase shift declines rapidly with increasing frequency of change in length of the cable. Higher frequency changes in the amount of cable stretch can be caused by "stick-slip" motion of the logging tool, as the combination of gravity and friction of the wellbore momentarily overcomes the upward pull of the logging cable, only to be violently released in a spring-like motion as the frictional force is overcome when the upward tension on the cable builds sufficiently.

Another method of determining the depth of logging tools in a wellbore is described in U.S. Pat. No. 3,490,149 issued to Bowers. The system disclosed in the Bowers '149 patent includes an accelerometer for measuring acceleration of the logging tools coaxial with the wellbore. Acceleration measurements of the logging tools coaxial with the wellbore are doubly integrated to provide a determination of change in axial position of the logging tools. The change in axial position determined from the doubly integrated accelerometer measurements is used to adjust the measured position of the tool as determined by measurements of the amount of cable which has passed a device for measuring the amount of cable extended into the wellbore. A drawback to the system disclosed in the Bowers '149 patent is that the doubly integrated acceleration measurements typically must be band limited by a filter to remove DC and very low frequency AC output from the accelerometer to correct for "drift in the zero reference" (also known in the art as bias error). The considerations in selecting the lower cutoff frequency are described in the Bowers '149 patent at col. 6, lines 25–71. If the acceleration on the tool falls below the cutoff frequency of the filter, then low frequency accelerations on the tool as may be caused by forces such as friction, which changes the tensile force on, and therefore the length of, the cable, may go undetected. The system disclosed in the Bowers '149 patent therefore is useful only to correct depth measurements for higher frequency accelerations on the logging tools.

An improvement on the method disclosed in the Bowers '149 patent is described in U.S. Pat. No. 4,545,242 issued to Chan. The system disclosed in the Chan '242 patent includes feedback amplifiers to decrease an error signal generated in the process of integrating accelerometer measurements to determine the true position of the logging tools in the wellbore. The system disclosed in the Chan '242 patent, however, still suffers the limitation of having substantially no system response below the lower cutoff frequency of a filter applied to the output of the accelerometers. The systems disclosed in Bowers '149 and Chan '242 are unable to provide accurate depth information in the event the electrical cable is "stretched" at frequencies below the cutoff of the filter applied to the accelerometer.

It therefore is an object of the present invention to provide a system for measuring the depth of a logging tool in a wellbore which measures the change in length of the logging cable, wherein the change in length of the logging cable can be calibrated for changes in the electrical properties of the cable.

It is a further object of the present invention to provide a system for determining the depth of a logging tool in a wellbore without the use of a fixed length reference cable at the earth's surface.

It is still a further object of the present invention to provide a system for determining the depth of logging tools in a wellbore which provides substantial response in a frequency range excluded by filters used in accelerometer-based systems, and in a frequency range excluded by the response of a phase detector in phase-shift detecting systems.

SUMMARY OF THE INVENTION

The present invention is a system for determining the depth of a logging tool attached to a cable extended into a wellbore penetrating an earth formation. A particular embodiment of the system includes a circuit for generating a measurement of phase shift in a sinusoidal electrical signal transmitted through the cable, the phase shift in the signal corresponding to the length of the cable. The system also comprises an accelerometer disposed within the tool and electrically connected to a bandpass filter. A double integrator is connected to the bandpass filter. The double integrator calculates position of the tool coaxial with the wellbore. The phase shift measurement is passed through a low-pass filter. The low-pass filter and the bandpass filter comprise at least some degree of bandpass overlap. The integrator output is used to generate a scale factor which is applied to the filtered phase shift measurement. The scaled phase shift measurement is conducted to a depth computer as are a signal generated by a depth encoder and the integrated accelerometer measurements. The depth encoder signal corresponds to the amount of cable extended into the wellbore. The depth computer calculates the depth of the tool in the wellbore by summing the scaled phase shift measurements, the integrated accelerometer measurements and the encoder measurements.

DESCRIPTION OF THE PREFERRED EMBODIMENT

The description of the preferred embodiment of the invention is divided into two pans. The first pan describes in detail the mechanics of stretching of logging cables and the adaptation of methods of the prior art to compensate for cable stretch in depth measurements. The second pan of the detailed description describes in detail the system according to the present invention for compensating for cable stretch in depth measurements.

1. Mechanics of cable stretch and prior art methods of compensation

Figure 1:
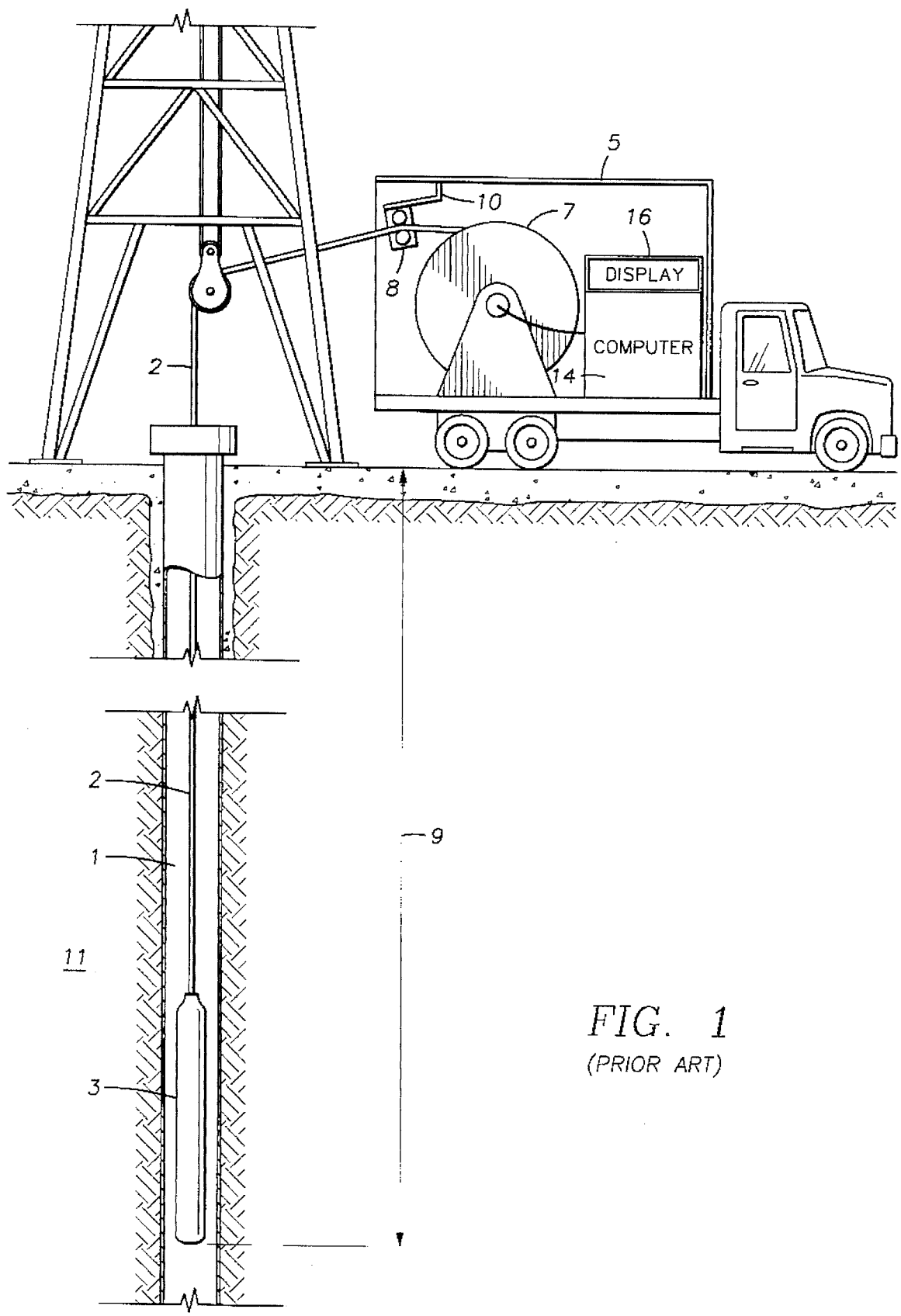
FIG. 1 shows a logging tool disposed in a wellbore, and the relationship of depth to cable length.

FIG. 1 shows a logging tool 3 as it is typically disposed in a wellbore 1. The tool 3 is typically attached to one end of a multi-conductor electrical logging cable 2. The logging cable 2 is typically unspooled from a cable drum 7 forming pan of a surface logging unit, shown generally at 5. Unspooling the cable 2 is performed in order to lower the tool 3 into the wellbore 1. As the cable 2 is unspooled from the drum 7, it passes through a measuring head 8 suspended from a spooling arm 10 forming part of the logging unit 5. The measuring head 8 comprises a device (which is shown in greater detail in FIG. 2 and which will be further explained) for measuring the length of cable 2 spooled from the drum 7. A well logging survey is typically conducted by first unspooling the cable 2 into the wellbore 1 to position the tools 3 to a desired depth, and then respooling the cable 2 onto the drum 7 while causing the tool 3 to make measurements corresponding to various properties of formations 11 penetrated by the wellbore 1.

The measuring head 8 is typically electrically connected to a computer 14 which can include a depth display 16. The length of cable 2 which is spooled into and out of the wellbore 1, as measured by the measuring head 8, typically corresponds directly to the depth 9 of the tool 3 within the wellbore, unless friction between the tool 3 and the wellbore 1 or weight of the tool 3 and cable 2 causes the cable 2 to stretch an indeterminable amount when the cable 2 is spooled back onto the drum 7.

Figure 2:
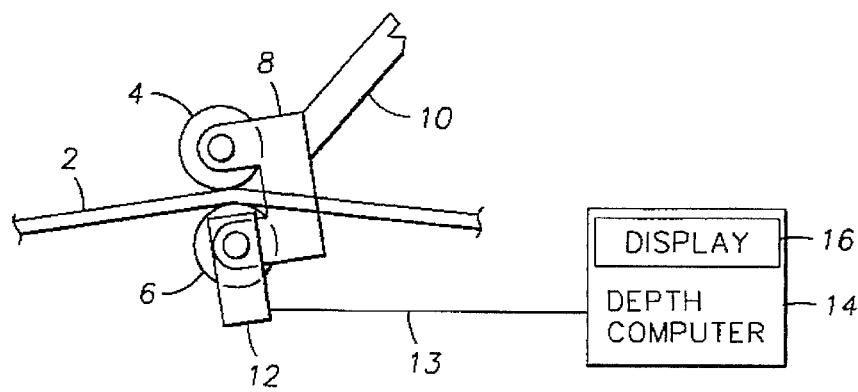
FIG. 2 shows a typical cable length measurement system.

FIG. 2 shows the measuring head 8 in greater detail. Attached to the head 8 are a measure wheel 6 and a pressure wheel 4. The cable 2 passes in between the wheels 4, 6 while pressed onto the measure wheel 6 by tangential force exerted by the pressure wheel 4. Frictional contact between the cable 2 and the measure wheel 6 during movement of the cable 2 causes corresponding movement of the circumference of the wheels 4, 6. The measure wheel 6 can be rotationally coupled to a digital encoder 12 which generates signals corresponding to the amount of rotation of the wheel 6. The signals can be transmitted to the computer 14 over a signal line 13. The measure wheel 6 is typically calibrated so that a predetermined amount of rotation of the measure wheel 6 exactly corresponds to a known length of cable 2 passing by the wheel 6.

Figure 3:
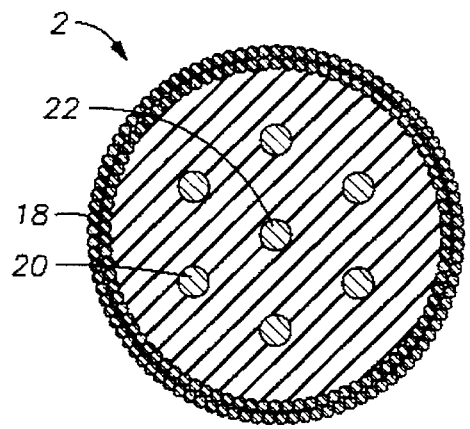
FIG. 3 shows an end view of a typical wireline logging cable.

FIG. 3 shows a cross-section of a typical multi-conductor well logging cable 2. The exterior of the cable 2 comprises helically wound armor wires 18 which are typically made of steel. Electrical conductors disposed internally to the armor wires 18 typically comprise a central conductor 22 and outer, helically wound conductors 20. The central conductor 22 is substantially collinear with the length of the cable 2, and is substantially coaxial with the cable 2 throughout the entire length of the cable 2. The outer conductors 20 are typically wound around the central conductor 22 in a helical pattern.

Figure 4:
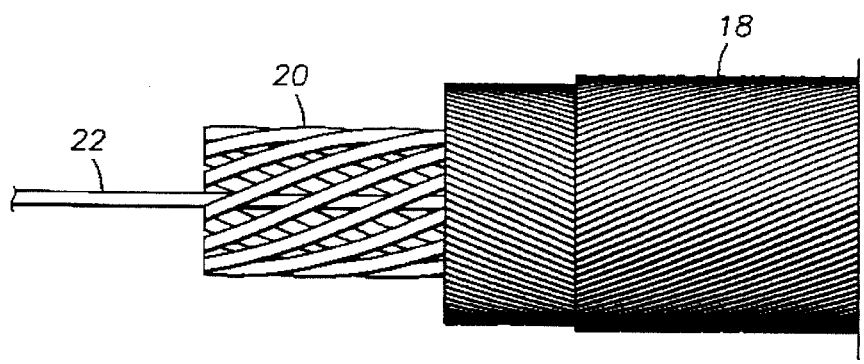
FIG. 4 shows a side view of the construction of the cable shown in FIG. 3.

FIG. 4 shows a side view of the construction of the cable 2 to illustrate the relative geometries of the central conductor 22 and the outer, helically wound conductors 20.

In a method described, for example, in U.S. Pat. No. 4,803,479 issued to Graebner et al, the overall length of the cable 2 can be estimated by transmitting an electrical signal over at least one helically wound conductor 20 from the logging unit (shown as 5 in FIG. 1), through the cable 2, to the tools (shown as 3 in FIG. 1). The signal can be applied to another one of the outer conductors 20 (or alternatively the central conductor 22) by means of an electrical turn around loop (not shown) disposed within the logging tools 3. The other helically wound conductor 20 (or alternatively, the central conductor 22) can then transmit the electrical signal back to the surface. The phase of the electrical signal between the source and the return points along the cable 2 can change as the cable 2 is stretched. Change in phase of the electrical signal can be measured by circuits (not shown separately in FIG. 2) in the logging unit 5. In particular, the change in length of the helically wound conductor 20 with respect to the change in length of the cable 2 must be calibrated for any particular cable in order to determine the actual change in length of the cable 2 corresponding to the measurement of change in phase of the electrical signal.

Figure 5:
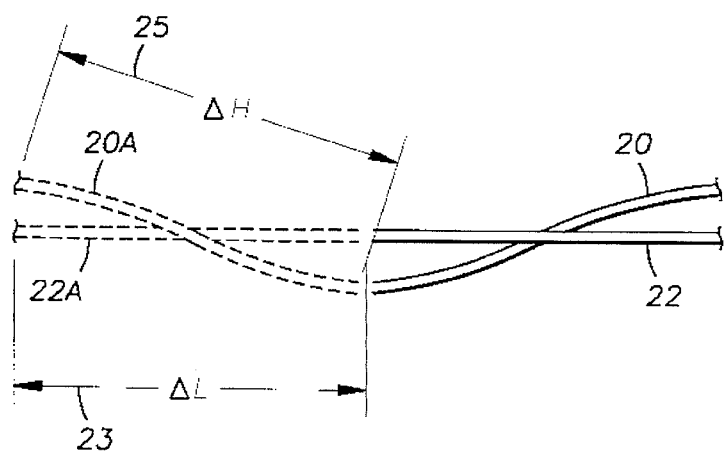
FIG. 5 shows how stretch in the cable affects the lengths of the different conductors in the cable.

FIG. 5 illustrates why measurement of the length of conductors 22, 20 in the cable 2 may not correspond precisely to a measurement of the overall length of the cable 2. As increasing tension is applied to the cable 2 the axial length of the cable 2 increases. The central conductor 22 will be lengthened substantially the same amount as the increase in axial length of the cable 2, as indicated by Δ at 23. The helically wound conductors 20, however, will undergo a length change different from that of the central conductor 22 because some of the change in axial length of the cable 2 is converted into unwinding of the helical lay of the outer conductors 20. The actual change in length of the outer conductors 20 is indicated by ΔH as shown at 25. Small variations in construction dimensions and material compositions of different logging cables 2 can cause the ratio of ΔH/ΔL to vary substantially from cable to cable.

2. System according to the present invention of compensating cable stretch in depth measurement.

The present invention includes a system for calibrating change in phase of an electrical signal passed through the cable (shown as 2 in FIG. 1) with respect to change in axial length of the cable 2. The calibration is provided by scaling the phase shift with respect to a measurement corresponding to the axial movement of the logging tools 3. A measurement corresponding to axial movement of the logging tools 3 can be generated by measuring acceleration of the logging tools 3 coaxial with the wellbore 1. Calibrating the measurement of change in phase of the electrical signal with respect to a measurement corresponding to the movement of the tools 3 coaxial with the wellbore 1 can provide increased accuracy in measurement of the overall length of the cable 2, and thereby increased accuracy of measurement of the true depth of the logging tools 3 within the wellbore 1.

Figure 6:
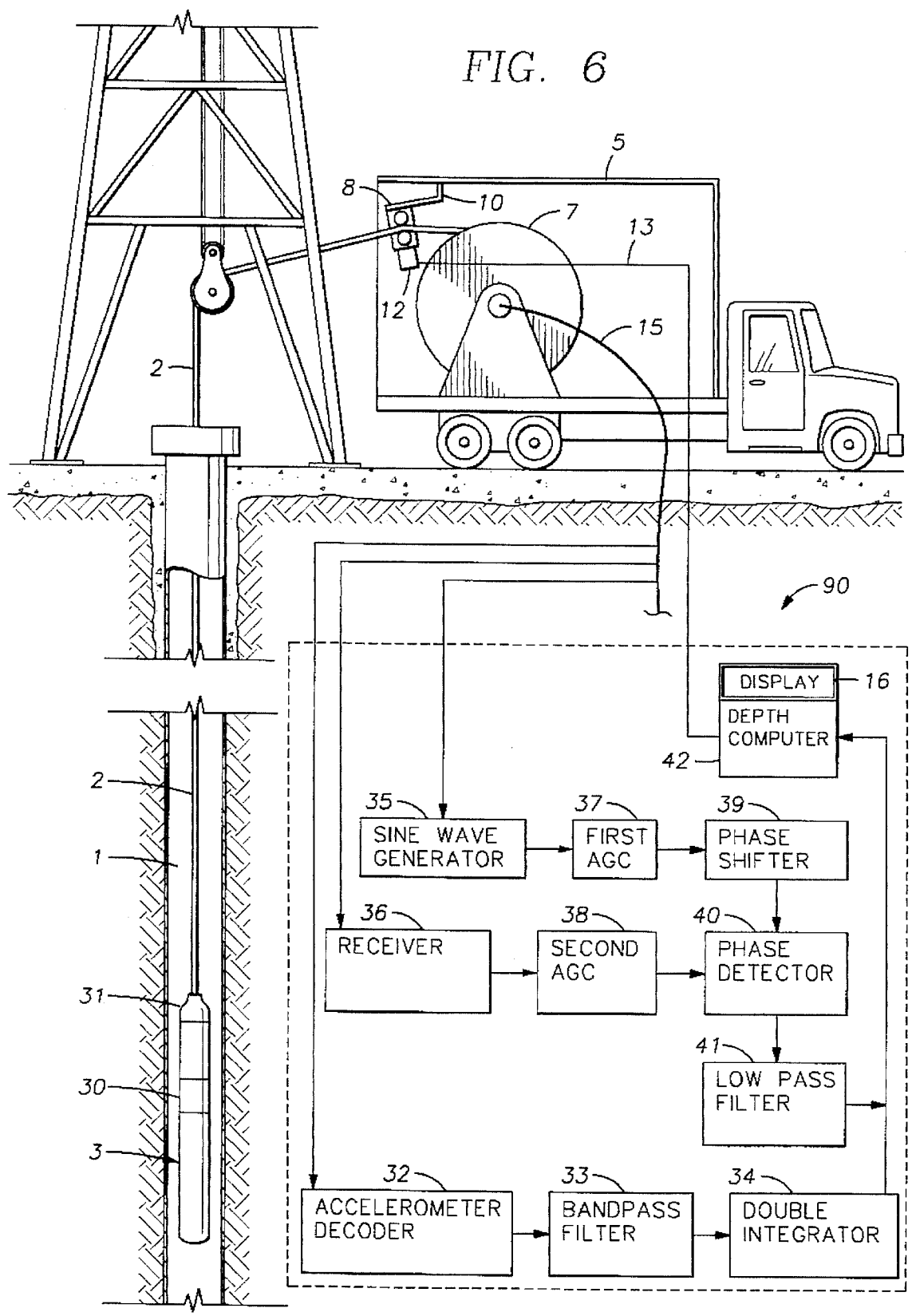
FIG. 6 is a functional block diagram of the depth measurement system.

The system according to the present invention can be better understood by referring to FIG. 6. The logging tools 3 can further comprise an accelerometer unit 30, and the turn around loop 31 previously referred to herein. The accelerometer unit 30 can be of a type known in the art. An accelerometer unit for providing measurements of the motion of the logging tools coaxial with the wellbore is described, for example, in U.S. Pat. No. 3,490,149 issued to Bowers. The accelerometer unit 30 imparts signals to the cable 2 corresponding to the instantaneous acceleration of the tools 3, typically along three orthogonal axes at least one of which is coaxial with the axis of the logging tools. As is understood by those skilled in the art, acceleration due to gravity must be excluded from the acceleration measurements, so acceleration measurements along the two other axes is typically included to resolve the component of gravity present on the acceleration measurement coaxial with the wellbore. The accelerometer 30 signals are conducted from the cable 2 through a slip ring and electrical connector link assembly 15 to an accelerometer decoder 32 which can form part of surface recording equipment 90 located within the logging unit (shown as 5 in FIG. 1). The decoder 32 interprets the accelerometer 30 signals and converts the decoded signals into measurements of acceleration of the tool 3 coaxial with the wellbore 1. The decoder 32 can calculate and subsequently exclude the acceleration due to gravity from the tool axial acceleration signals. It is to be understood that the inclusion of the accelerometer decoder 32 in the surface equipment 90 is a matter of convenience for the system designer and is not to be construed as a limitation on the invention. For example, the accelerometer decoder 32 could as easily be disposed in the logging tools 3 so that the signal applied to the cable 2 represents only the acceleration of the logging tools coaxial with the wellbore 1.

The axial acceleration measurements are conducted to a bandpass filter 33, which can also form part of the surface equipment 90. The bandpass filter 33 limits the acceleration measurements subsequently used in determining axial movement of the tools 3 to those frequency components typically between 0.05 Hz and 100 Hz. The bandpass filtered accelerometer unit 30 signals are then conducted to a double integrator 34. The double integrator 34 can be of a type known in the art. The double integrator 34 converts the acceleration measurements into calculations of the position of the logging tools 3 with respect to time.

As is understood by those skilled in the art, the position of the logging tools 3 calculated from the output of the double integrator 34 is subject to error called "random-walk". Random walk is primarily caused by doubly-integrating bias error and noise in the output the accelerometer unit 30. Bias error includes non-zero output from the accelerometer unit 30 when the actual acceleration on the tools 3 is zero. Double integration of non-zero acceleration signals (the bias error) when the acceleration on the tools 3 is substantially zero typically results in calculated position error which is proportional to the total integration time. Band-pass filtering the accelerometer 30 signals, particularly by removing components in the frequency range from DC to about 0.05 Hz, is equivalent to limiting the integration time of the double integrator 34. Limiting the integration time limits the error from random walk. The high-cut portion of the band-pass filter 33 limits the error in the calculated position caused by signal components, which can include random electrical noise, occurring at frequencies above the response range of the accelerometer unit 30. The high-cut frequency of the bandpass filter 33 typically is about 100 Hz. It is to be understood that the frequency range of the bandpass filter 33 disclosed herein is not meant to be an exclusive range of frequencies which will perform the function required of the bandpass filter 33. As is understood by those skilled in the art, higher-quality accelerometer units 30 are typically subject to lower overall bias error and noise and may function well according to the present invention with a bandpass filter having a lower cut-off frequency of a low as 0.001 Hz, and high-cut frequencies in excess of 200 Hz. A particular limitation of the high-cut frequency of the bandpass filter 33 is the frequency response of the logging cable 2 to telemetry of signals generated by the other sensors (not shown) in the logging tools 3. It is preferable that the high-cut frequency of the bandpass filter 33 not exceed ¼ the rate at which the logging tools 3 can transmit data to the surface equipment 90.

The output of the double-integrator 34 represents time-varying components of the axial position of the logging tools 3. The time-varying components of the measurements output from the double integrator 34 can be conducted to a depth computer 42. The operation of the depth computer 42 will be further explained.

Simultaneously with determining the time-varying components of the position of the logging tools 3, an apparent length of the cable 2 can be calculated by measuring phase shift in an electrical signal transmitted through the cable 2. The electrical signal can be generated by a sine wave generator 35, which can also form part of the surface equipment 90. The sine wave generator 35 is also typically connected to the cable 2 by means of the link assembly 15. The signal generated by the sine wave generator 35 is typically transmitted along one helical conductor (shown as 20 in FIG. 3) in the cable 2, passes through the turn around loop 31 disposed in the logging tools 3, and then can be returned to the earth's surface on the central conductor (shown as 22 in FIG. 3). As is understood by those skilled in the art, measurement of change in phase Of the electrical signal, corresponding to change in length of the cable 2, will have increased accuracy as the frequency of the electrical signal is increased. However, as is also known in the art, the cable 2 acts as a lowpass filter, so the frequency of the generator 35 signal is typically limited by the frequency response of the logging cable 2. It is contemplated that using synchronous detection techniques known in the art that the sine wave generator 35 can operate at a frequency of 150 to 300 KHz. It is to be understood that the sine wave generator 35 is not meant to be an exclusive representation of the types of electrical signal generators which will perform the function of the present invention. Any signal waveform which has a time-of transmission related characteristic corresponding to the overall length of the transmission path will perform the stretch measurement function required by the present invention. A square wave generator and leading edge time-of-detection circuitry is a suitable example of such a substitute waveform measurement system.

The signal which is returned to the earth's surface by the turn around loop 31 is conducted from the link 15 to a receiver 36, which can also form part of the surface equipment 90. The receiver 36 detects and measures the phase of the returned signal with respect to the signal output from the sine wave generator 35. As previously described, the receiver 36 can include synchronous detection circuitry (not shown) to facilitate detection of very small amplitude sine wave signals in the presence of telemetry signals transmitted by the logging tools 3. A first automatic gain control (AGC) 37 can be coupled to the sine wave generator 35, and a second AGC 38 can be coupled to the receiver 36. The output of the first AGC 37 provides a phase reference signal for measurement of the phase difference of the cable-returned signal detected in the receiver 36. The AGC's 37, 38 match the amplitudes of the transmitted and returned signals so that phase difference measurement will not be substantially affected by variations in amplitudes of the transmitted and received signals. The phase reference signal is preferably coupled to a phase shifter 39 which provides a 180 degree phase shift to the reference signal. It is contemplated that the phase shifter 39 can also provide a selectable phase shift to enable generation of a reference signal which can be selected to be exactly 180 degrees out of phase with the cable-returned signal detected in the receiver 36 when the cable 2 undergoes a predetermined condition of stretch. As is known in the art, a predetermined condition of stretch can be provided by application of a known tensile stress on the cable 2 in a laboratory fixture (not shown) disposed at the earth's surface and more typically used for application of magnetic depth control "marks" to the exterior armor wires on the cable 2. The laboratory fixture is not typically used at the wellbore as is known in the art.

The phase-shifted reference signal output from the phase shifter 39, and the signal output from the receiver 36 are conducted to a phase detector 40. The phase detector 40 measures the phase difference between the receiver 36 output and the phase shifter 39 output, and generates a signal corresponding to the phase difference measured therein. If the phase shifter 39 includes the contemplated feature of providing a selectable phase shift to the reference signal, so as to be 180 degrees out of phase with the receiver 39 output at a predetermined stretch in the cable 2, the signals when combined in the phase detector 40 will substantially cancel each other when the cable 2 undergoes the predetermined condition of stretch. The combination signals so that they cancel each other at the predetermined stretch condition enables the use of very high gain in the phase detector 40. As is understood by those skilled in the art, a very high gain phase detector 40 can substantially increase the accuracy of the phase measurement between the reference signal from the phase shifter 39 and the receiver 39 output.

As previously described, the output of the phase detector 40 comprises a signal corresponding to the phase shift between the output of the phase shifter 39 and the receiver 36 output. The output of the phase detector 40 is preferably conducted to a low-pass filter 41. The low-pass filter 41 has a cutoff frequency which in the present embodiment can be about 5 Hz. The low-pass filter 41 is provided to remove frequency components of the signal output from the phase detector 40 which are likely to exceed a range of accurate correspondence between the phase difference measurement and the overall length of the cable 2. The cutoff frequency of the lowpass filter 41, however, exceeds the lower cutoff frequency of the bandpass filter 33, as will be further explained. The output of the low-pass filter 41 substantially comprises a band-limited signal corresponding to, but not calibrated to, the length of the electrical conductors (shown as 20 and 22) over which the electrical signal travels.

Figure 7:
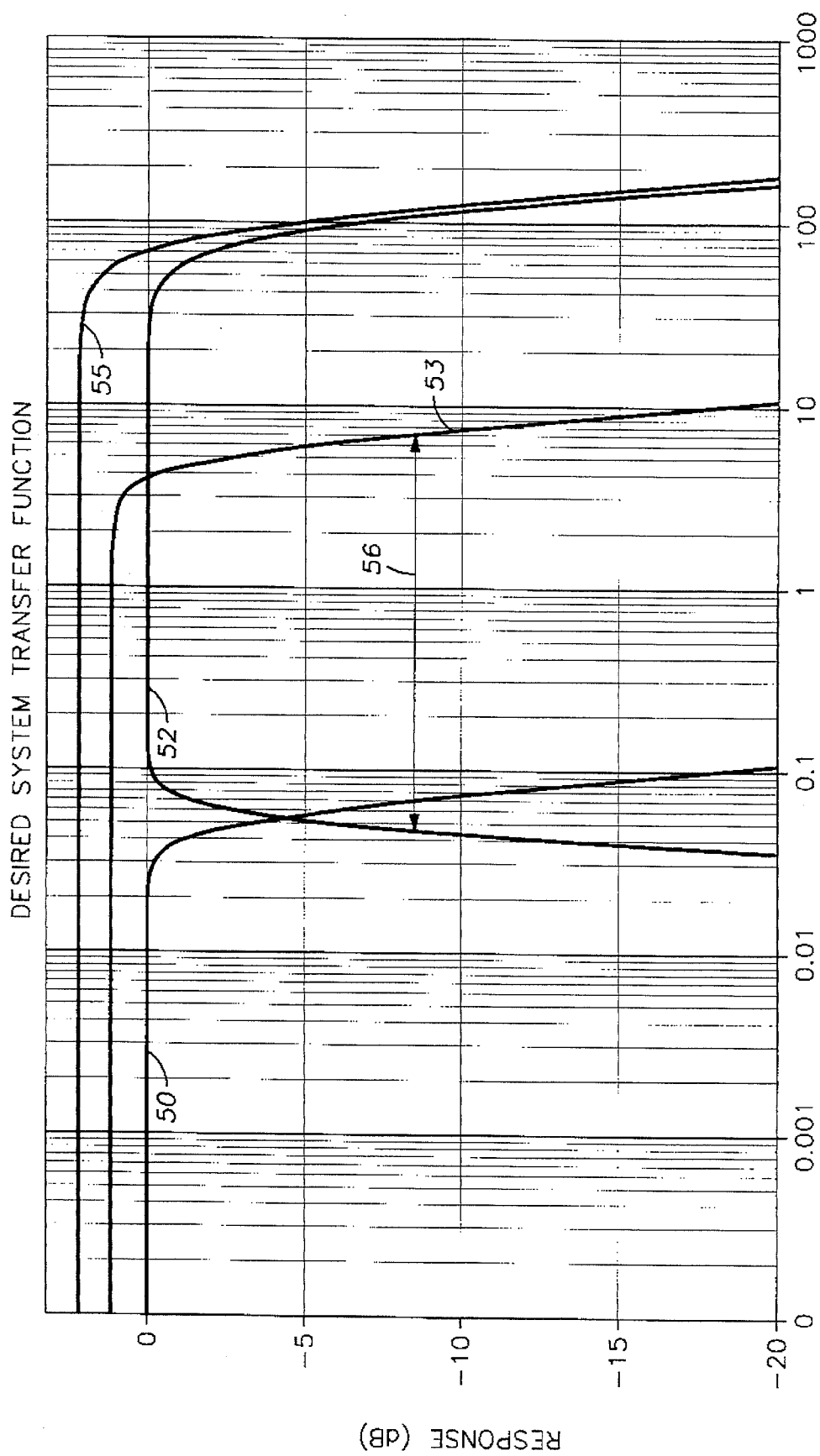
FIG. 7 is a graphic representation of filter responses for bandpass filters connected to an accelerometer and a low pass filter connected to a phase shift measuring circuit.

The relative responses of the bandpass filter 33 and the low-pass filter 41 can be observed by referring to FIG. 7. The low-pass filter response is shown generally at 50. The bandpass filter response is shown generally at 52. A region of response common to both the bandpass filter 33 and the low-pass filter 41 is shown generally at 56. It is desirable that the overall system response be as indicated by the curve shown at 55. The significance of the response curves 50, 52, 53 and 55 will be further explained.

Referring again to FIG. 6, the present invention combines the measurements of phase shift (corresponding to change in length of the cable 2) with measurements of change in axial position (calculated by doubly integrating the accelerometer unit 30 measurements) to precisely scale the measurements of phase shift into measurements of change in length of the cable 2. Measurements of phase shift output from the low-pass filter 41 represent both low frequency time-varying (AC) and static (zero frequency or DC) components of a measurement which corresponds to the overall length of the cable 2. The output of the double integrator 34 represents the time-varying (AC) components of the position of the logging tools 3 coaxial with the wellbore 1. Within the overlap band (56 in FIG. 7), which in the present embodiment can comprise the range of about 0.05 to 5 Hz, the measurement of position as calculated by the double integrator 34 will correspond exactly to the change in length of the cable 2, and can therefore be used to scale the change in phase of the electrical signal. A method of calculating a scale factor by which the phase shift is scaled into change in position will be further explained.

The calibrated measurements of phase shift, which then represent measurements of the length of the cable 2, can be summed in the depth computer 42 with the measurements made by the encoder 12. The encoder 12 measurements, as previously described, correspond to the amount of cable 2 extended into the wellbore 1. The amount of cable 2 extended into the wellbore can be adjusted by the measurements corresponding to the length of the cable to calculate the true depth of the tools 3 in the wellbore 1. The calculated true depth of the tools 3 can be displayed on a suitable optical numerical display device, shown as 16, such as a liquid crystal display (LCD) which is coupled to the computer 42.

It is contemplated that the scale factor can be recalculated at periodic intervals, which in the present embodiment can be about 60 seconds, so that changes in electrical response of the cable 2 which may occur as the cable 2 is withdrawn from the wellbore 1 can be compensated.

Referring once again to FIG. 7, the response of the phase shift measurement is band-limited to the high-cut frequency of the low-pass filter (41 in FIG. 6). Some types of motion of the logging tools (3 in FIG. 6) can occur at significantly higher frequencies than the 5 Hz high-cut of the low-pass filter (41 in FIG. 6). Therefore in the present invention, the output of the bandpass filter 33 can be summed with the encoder 12 signals and the calibrated phase shift measurements in the depth computer 42 to provide accurate indication of the true depth of the logging tools at a frequency response up to the response limit of the accelerometer unit 30. In the present embodiment of the invention, the response limit is typically defined by the upper cutoff of the bandpass filter 33. The response of the bandpass filter m as can be observed in FIG. 7 includes a high-cut frequency of about 100 Hz. The method of combining the bandpass filtered accelerometer unit 30 signals with the encoder 12 and phase shift signals will be further explained.

Figure 8:
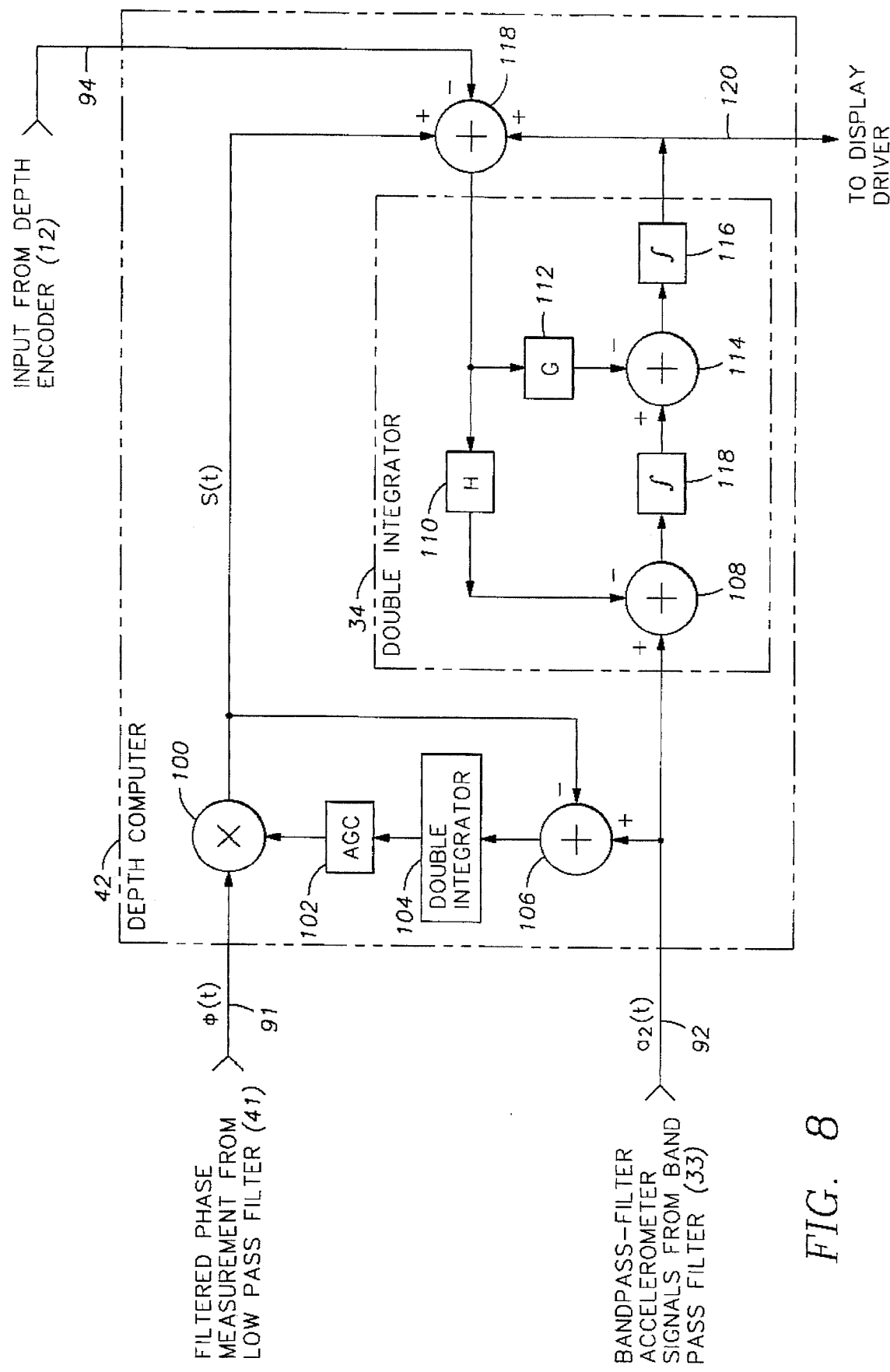
FIG. 8 shows how accelerometer measurements are combined with phase shift measurements in the depth computer to determine true depth of the logging tools.

The means by which the present invention determines depth of the logging tools (3 in FIG. 6) from the summed measurements can be better understood by referring to FIG. 8. FIG. 8 shows, in more detail, functions which can be programmed into the depth computer 42 to determine the true depth of the tools (3 in FIG. 1) in the wellbore (1 in FIG. 1). The signal output from the low pass filter 41 is shown as a phase input 91 to the depth computer 42 comprising the filtered phase measurement as a function of time (represented as φ(t)). The signal output from the bandpass filter 33, which comprises acceleration measurements (represented as a(t)) is shown as input 92 to the computer 42. The acceleration input 92 can be conducted to one input of summing junction 106. The output of summing junction 106 can be conducted to a second double integrator 104. The output of the second double integrator 104 represents time-varying components of the position of the logging tools (3 in FIG. 1) in the wellbore (1 in FIG. 1). The output of the second double integrator 104 can be conducted through an automatic gain control 102, and then conducted to an input of a multiplier junction 100. Another input of the multiplier junction 100 can be connected to the phase input 91. The output of multiplier 100 comprises a scale factor by which time-varying phase measurements can be convened into time-varying position measurements, thereby calibrating the phase measurement into measurements of cable stretch. The output of the multiplier 100 can also be conducted to an inverting input of summing junction 106 to provide a feedback loop. The feedback loop recalibrates the scale factor so that the phase measurement is substantially always calibrated to accurately represent the amount of cable stretch. The output of the multiplier 100 also represents the phase measurement scaled into change in length of the cable (2 in FIG. 1). The output of the multiplier can also be conducted to summing junction 118, as will be further explained.

The acceleration input 92 (from the bandpass filter 33), as previously described, can be conducted to the double integrator 34. As shown in FIG. 8, double integrator 34 can include two individual integrators 116 and 118, two summing junctions 108 and 114 and two feedback amplifiers 110 (represented by the variable H) and 112 (represented by the variable G). Inputs to the feedback amplifiers 110, 112 can be conducted from the output of summing junction 118. One input to summing junction 118 can be the output of the second one (116) of the individual integrators. The output of the second individual integrator 116 represents time-varying components of the position of the logging tools (3 in FIG. 1). The operation of the double integrator 34, including methods for determining the gain of the feedback amplifiers 110, 112 are known in the art and are described, for example in U.S. Pat. No. 4,535,242 issued to Chan (FIG. 4 and col. 7 lines 26–55). The feedback amplifiers 110, 112 are gain-adjusted so that the difference between an encoder input signal 94 (provided to an inverting input on summing junction 118) and the scaled phase shift measurement and integrated accelerometer measurements is driven towards zero. The specific improvement provided by the present invention over the systems such as described in Chan '242 is the inclusion of the phase shift measurements scaled into measurements of the overall length of the cable (2 in FIG. 1). By providing properly calibrated cable length measurements, the present invention is able to overcome a limitation of the prior art, namely that substantially no tool position measurement was provided in a frequency range between DC (the encoder measurement) and the lower cutoff frequency of the bandpass filter (such as 33 in FIG. 11). The present invention uses the calibrated phase shift measurements to fill the "gap" in the frequency response of the systems of the prior art.

The indicated depth output from the computer 42 can be provided at 120 to a display driver (not shown) for the depth display (16 in FIG. 2).

It is to be understood that the functions shown for the depth computer 42 described in FIG. 8 can also be implemented in well known analog electronics. The operation of the depth computer 42 is intended to implement a solution to the following expression wherein s represents the Laplace transform of a derivative operator:

$$D = \frac{FH(s) \cdot FL(s) \cdot a}{s^2 + G \cdot s + H} + \frac{G \cdot s + H}{s^2 + G \cdot s + H} \cdot (E - LPF(s) \cdot (\phi))$$

In the above expression, D represents the depth of the tool which is indicated at output 120 in FIG. 8, G and H represent the gains of feedback amplifiers 112 and 110, respectively, E represents the encoder (12 in FIG. 2) measurement, a represents the acceleration measurement, LPF represents the response function of the low pass filter (41 in FIG. 6), FL and FH represent the low and high cutoff responses, respectively of the bandpass filter (33 in FIG. 6) and $\phi$ represents the scaled phase shift measurements.

The above expression represents a solution to a more general expression for the motion of the logging tools 3. This more general expression can be shown as:

$$\frac{d^2D}{dt^2} + G \cdot \frac{dD}{dt} + H \cdot D = FH(s) \cdot FL(s) \cdot a +$$

$$G \cdot \frac{d}{dt} (E - LFP(s) \cdot \phi) + H \cdot (E - LPF(s) \cdot \phi)$$

FL(s), FH(s) and LPF(s) may further be determined by the expressions:

$$FH(s) = \frac{s^3}{s^3 + 2 \cdot \omega_\eta \cdot s^2 + 2 \cdot \omega_\eta^2 \cdot s + \omega_\eta^3} : \omega_\eta = 2\pi \cdot f_H$$

-continued $$FL(s) + \frac{\omega_\lambda^2}{s^2 + \sqrt{2} \cdot \omega_\lambda \cdot s + \omega_\lambda^2} : \omega_\lambda = 2\pi \cdot f_L$$

$$LPF(s) = \frac{\omega_\sigma^2}{s^2 + \sqrt{2} \cdot \omega_\sigma \cdot s + \omega_\sigma^2} : \omega_\sigma = 2\pi \cdot f_{LFP}$$

The gain terms H and G for the feedback amplifiers 110, 112 can be described in terms of a so-called "crossover frequency" $\omega$:

$$H = \omega_\mu^2, G = \sqrt{2} \cdot \omega_\mu$$

The crossover frequency is generally determined by the cut-off responses of the both the low-pass filter 41 and the bandpass filter 33. In the present embodiment the crossover frequency can be about 2 Hz. The response of the feedback amplifiers 110, 112 and the significance of the crossover frequency will be further explained.

Figure 9:
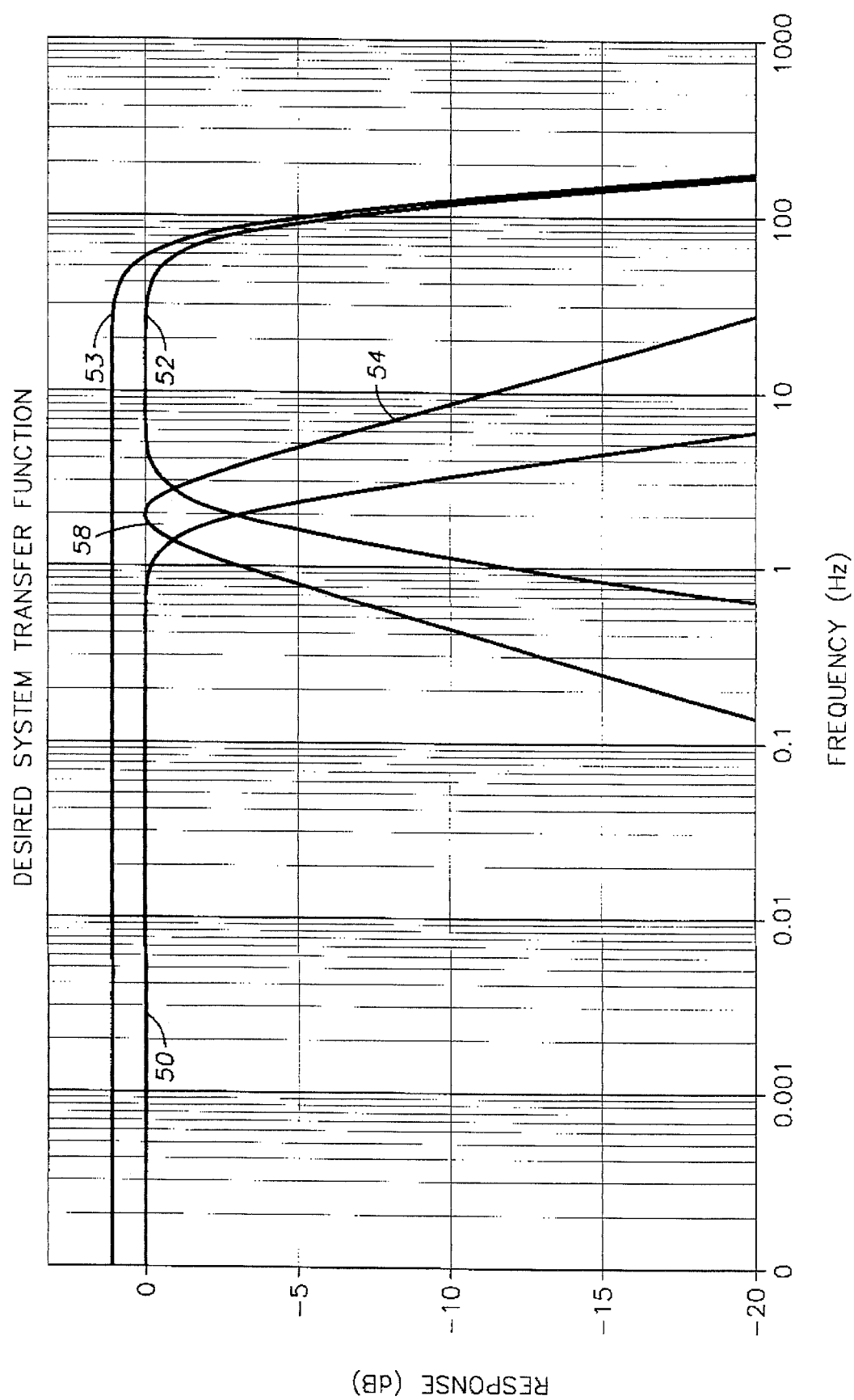
FIG. 9 shows the system response function for the system as described in FIG. 8.
Figure 10:
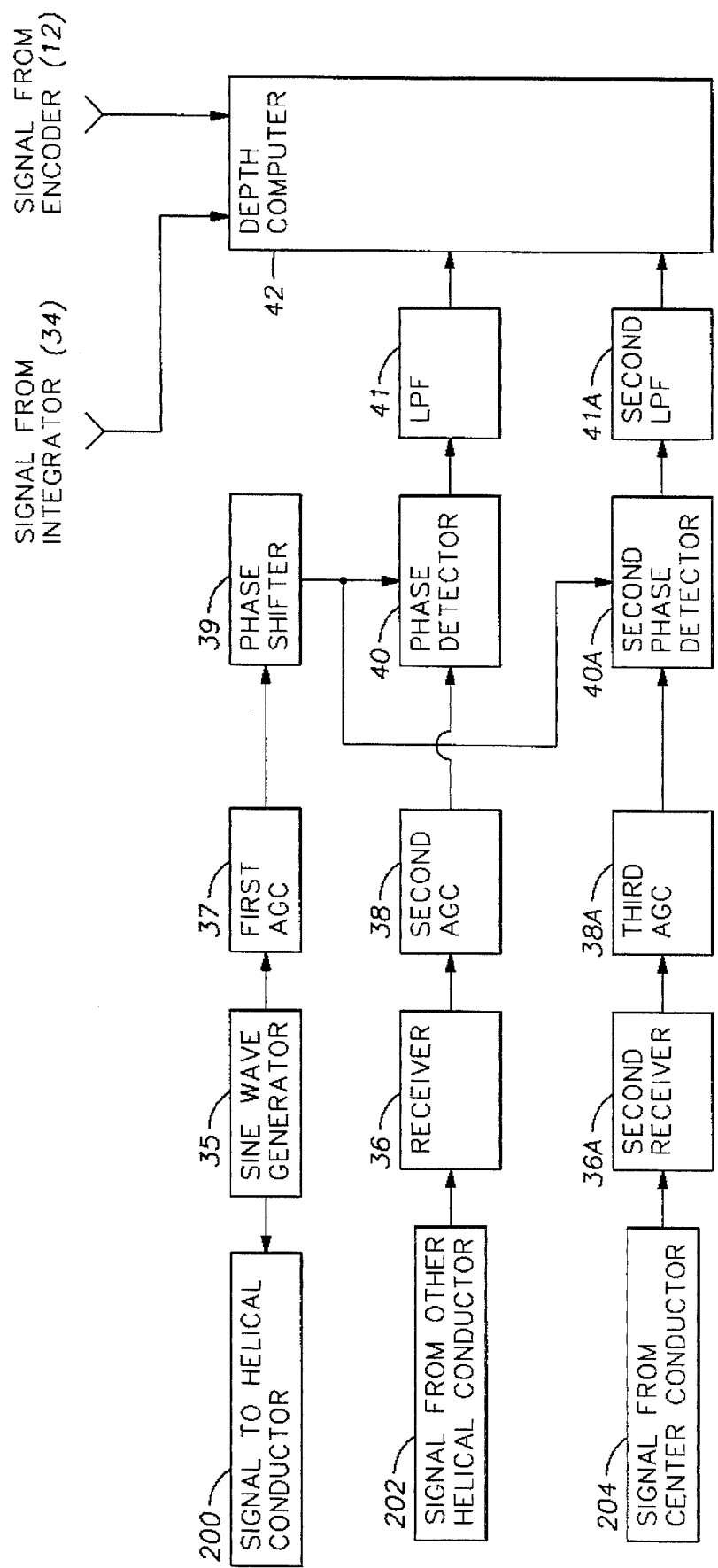
FIG. 10 shows an alternative system for scaling phase shift measurements into cable stretch measurements.

The response of the system functions ascribed to the depth computer 42 can be better understood by referring to FIG. 9. The response of the low-pass filter (shown as 41 in FIG. 6), shown at 50 and as previously explained, is generally attenuated above frequencies of about 5 Hz. The bandpass filter (shown as 33 in FIG. 6) typically has a lower cutoff frequency of 0.05 Hz. The frequency response of the bandpass filter 33 is shown generally at 52. The overlap band, comprising response frequencies common to the bandpass filter 33 and the low pass filter 41, is shown in FIG. 10 at 56.

Scaling the phase shift signals using the signals from the double integrator (shown as 34 in FIG. 6), provides cable 2 length measurements having frequency response which extends substantially to the cutoff frequency of the low-pass filter 41. Changes in length of the cable 2 which occur at a higher frequency than the cutoff frequency of the low-pass filter 41, about 5 Hz, will therefore not be determinable by using the phase shift measurements. Changes in length of the cable 2 at frequencies above 5 Hz, however, can be determined by combining the scaled phase shift measurements with the output of the double integrator 34. The response of the accelerometer unit (30 in FIG. 6) is typically limited by the upper frequency cutoff of the bandpass filter 33, about 100 Hz, so as previously explained, the system response can be extended to about 100 Hz by summing the accelerometer 30 measurements with the scaled phase shift measurements.

In order to generate accurate depth measurements by combining the scaled phase shift signals with integrated accelerometer measurements from the double integrator 34, however, requires that the combination of measurements have substantially flat (constant gain) response over the entire bandwidth of the combined measurements, meaning that at all frequencies occurring within the desired system bandwidth, the input signals are neither amplified nor attenuated by the system. Because the bandwidth of the low-pass filter 41 and the bandpass filter 34 have significant overlap, shown generally at 56, a direct combination of the two signals would generate some amplification response within the overlap band 56. It is therefore desirable to equalize the response of the phase shift and integrated accelerometer measurements before summing them.

As is understood by those skilled in the art, it difficult to design a filter having a so-called "brick-wall" response, that is, as response having no attenuation within the passband and substantially perfect attenuation beginning exactly at the cut-off frequency. Therefore the response of the low-pass filter 41 typically must have some response overlap with the bandpass filter 33. Within the response overlap of the bandpass filter 33 and the low pass-filter 41, shown generally at 56, the combined response of the two filters typically will not comprise unity gain as a result of the limitations of filter design. The feedback loop (comprising amplifiers 110 and 112 in FIG. 8) filter 44, the response of which is shown generally at 58, substantially restores the combined response of the low-pass filter 41 and the bandpass filter 33 to having substantially unity gain over the frequency range from DC to the upper cutoff of the bandpass filter, as shown in the combined system response curve at 53 in FIG. 9. The process of restoring the response of the combined outputs of the bandpass filter 33 and the low-pass filter 41 to unity gain over the combined frequency response range is known in the art as equalization filtering.

DESCRIPTION OF AN ALTERNATIVE EMBODIMENT

FIG. 10 shows an alternative embodiment of a system for generating a measurement of phase shift in an electrical signal with respect to change in length of the cable 2 which more accurately corresponds to change in length of the conductors (shown as 20, 22 in FIG. 3) in the cable 2. The alternative system includes the addition of a second sine wave receiver 36A connected to the central cable conductor 22, a third AGC 38A connected to the second receiver 36A, and a second phase detector 40A connected to the phase shifter 39 and the third AGC 38A. The output of the second phase detector 40A is conducted to a second low pass filter 41A, and the second low-pass filter 41A output is conducted to the depth computer 42.

An improvement to the measurement of overall length of the cable 2 can be provided by the present invention because tension along the cable 2 can be unequally distributed along the length of the cable 2. Unequal distribution of tension can be caused by the existence of different amounts of cable 2 friction against the wall of the wellbore (shown as 1 in FIG. 1) at various positions along the cable 2 suspended in the wellbore 1. The unequal distribution of tension may result in changes in length of the helical conductors (shown as 20 in FIG. 3) which do not linearly correspond to changes in the overall length of the cable 2.

The alternative embodiment as shown in FIG. 11 calibrates phase shift in an electrical signal transmitted through the cable 2 into change in length of the cable 2 by measuring phase shift in the signal transmitted along one helically wound conductor (shown as 20 in FIG. 3), as shown at 200, and returned on another helically wound conductor, as shown at 202. The measurement of phase shift along the two helical conductors 20 is then compared with a second measurement of phase shift in the signal as it is transmitted through the one helical conductor 20, also shown at 200, and then is returned along the central conductor 22 as shown at 200 and 204. The amount of phase shift corresponding only to the helical conductors 20 can then be divided by two, and subtracted from the measurement of phase shift corresponding to both the helical 20 and central 22 conductors. The resultant phase shift measurement corresponds only to change in length of the central conductor 22, which more linearly corresponds to the change in length of the cable 2.

Calculation of the scale factor to convert the phase shift measurement into change in length of the cable 2 can be performed by scaling the bandpass filtered, doubly-integrated signal from the accelerometer 30 with respect to the low-pass filtered phase shift signal. The scaling can be performed in the computer 42 substantially identically as in the first embodiment of the invention.

What is claimed is:

1. An apparatus for determining the depth of a well logging tool attached to an electrical logging cable extended into a wellbore, said apparatus comprising:

an electrical signal source connected to said logging cable;

a circuit electrically connected to said logging cable for measuring a phase shift in an electrical signal conducted from the earth's surface through said logging cable;

an accelerometer unit disposed within said logging tool for imparting a signal to said cable corresponding to an acceleration of said tool coaxial with said wellbore;

a bandpass filter connected to said accelerometer unit for attenuating bias and noise output from said accelerometer unit;

a double integrator connected to said bandpass filter for calculating a position measurement of said logging tool from said bandpass filtered acceleration signal;

a depth encoder operation,ally contacting said cable for generating a signal corresponding to an amount of said cable traversing said encoder; and a depth computer coupled to said double integrator, said circuit for measuring phase shift and said depth encoder, said depth computer for scaling said measurement of phase shift into measurement of stretch in said cable by multiplying said phase shift measurement by an output of an additional double integrator forming part of said computer and coupled to an output of said bandpass filter, said depth computer for summing said encoder signal, said scaled phase shift measurement and said position measurement to calculate said true depth of said logging tool.

2. The apparatus as defined in claim 1 wherein said bandpass filter comprises a frequency range of approximately 0.05 Hz to 100 Hz.

3. The apparatus as defined in claim 1 wherein said electrical signal source comprises a sine wave generator.

4. The apparatus as defined in claim 3 wherein said sine wave generator operates within a frequency range of approximately 150 to 300 KHz.

5. The apparatus as defined in claim 1 wherein said circuit for measuring phase shift comprises a synchronous detector.

6. The apparatus as defined in claim 5 wherein said circuit for measuring phase shift in said electrical signal further comprises:

a first receiver coupled to a substantially straight one of said conductors in said logging cable;

a first phase detector coupled to said first receiver for measuring phase shift in said electrical signal along said substantially straight conductor;

a second receiver coupled to a helically wound one of said electrical conductor in said cable;

a second phase detector coupled to said second receiver;

output of said first phase, detector and said second phase detector coupled to said depth computer wherein said first and said second measurements of phase shift can be summed to generate a composite measurement of phase shift corresponding to a change in length of said electrical cable.

7. A method of determining the depth of a logging tool attached to a cable extended into a wellbore penetrating an earth formation, said method comprising the steps of:

generating a signal corresponding to a length of cable traversing a depth encoder;

generating a measurement of acceleration of said logging tool coaxial with said wellbore;

bandpass filtering said measurement of acceleration;

twice integrating said bandpass filtered measurement of acceleration, thereby generating a measurement of position;

generating a measurement of phase shift of an electrical signal transmitted through said cable, said measurement of phase shift corresponding to a length of said cable;

low-pass filtering said measurement of phase shift;

scaling said measurement of phase shift into measurement of stretch in said cable by multiplying said phase shift by an additional twice integrated bandpass filtered measurement; and summing said twice integrated measurement, said scaled measurement of phase shift and said signal from said encoder to generate a measurement of said true depth.

8. The method as defined in claim 7 further comprising the steps of:

further low-pass filtering said measurement of phase shift at a cutoff frequency substantially the same as a lower cutoff frequency of said step of bandpass filtering;

summing said further low-pass filtered measurement of phase shift and said bandpass filtered twice-integrated accelerometer measurement to generate a combined position measurement; and equalization filtering said combined position measurement.

9. A method of scaling a measurement of phase shift of an electrical signal traversing a well logging cable to correspond to change in length of said cable while said cable is disposed within a wellbore, said method comprising the steps of:

measuring acceleration coaxial with said wellbore of a logging tool attached to one end of said cable;

bandpass filtering said measurement of acceleration;

twice integrating said bandpass filtered measurement of acceleration to generate a measurement of position of said logging tool;

measuring phase shift in an electrical signal transmitted through said logging cable;

multiplying said measurement of position by said measurement of phase shift to generate a scaled measurement of phase shift corresponding to said length of said well logging cable.

10. The method as defined in claim 9 wherein said electrical signal transmitted through said logging cable comprises a sinusoidal signal.

11. The method as defined in claim 10 wherein said sinusoidal signal comprises a frequency within a range of approximately 150 to 300 KHz.

12. The method as defined in claim 9 further comprising providing an output of said step of multiplying to a feedback loop coupled to an input of a multiplier for recalibrating said scaled measurement of phase shift for changes in electrical properties of said well logging cable.

13. An apparatus for determining the depth of a well logging tool attached to an electrical logging cable extended into a wellbore, comprising:

an electrical signal source connected to said logging cable;

a first circuit for measuring a phase shift in a signal conducted from said source through said logging cable along a substantially straight electrical conductor in said cable;

a second circuit for measuring a phase shift in said electrical signal conducted from the earth's surface through said logging cable along a substantially helically wound electrical conductor in said cable;

an accelerometer unit disposed within said logging tool for imparting a signal to said cable corresponding to an acceleration of said tool coaxial with said wellbore;

a bandpass filter connected to said accelerometer unit for attenuating bias and noise output from said accelerometer unit;

a double integrator connected to said bandpass filter for calculating a position measurement of said logging tool from said bandpass filtered acceleration signal;

a depth encoder operatively contacting said cable for generating a signal corresponding to an amount of said cable traversing said encoder; and a depth computer coupled to said double integrator, said first circuit measuring phase shift, said second circuit for measuring phase shift and said depth encoder, said depth computer for scaling said first and said second measurements of phase shift into a measurement of stretch in said straight conductor of said cable by summing and multiplying said first and said second phase shift measurements by an output of an additional double integrator forming part of said computer and coupled to an output of said bandpass filter, said depth computer for summing said encoder signal, said scaled phase shift measurements and said position measurement to calculate said true depth of said logging tool.

14. The apparatus as defined in claim 13 wherein said bandpass filter comprises a frequency range of approximately 0.05 Hz to 100 Hz.

15. The apparatus as defined in claim 13 wherein said electrical signal source comprises a sine wave generator.

16. The apparatus as defined in claim 15 wherein said sine wave generator operates within a frequency range of approximately 150 to 300 KHz.

17. The apparatus as defined in claim 13 wherein said first circuit and said second circuit for measuring phase shift each comprise a synchronous detector.

* * * * *